3,758,466
PYRROLE METHINE CATIONIC DYES
John G. Fisher and Clarence A. Coates, Jr., Kingsport, Tenn., assignors to Eastman Kodak Company, Rochester, N.Y.
No Drawing. Filed Dec. 13, 1971, Ser. No. 207,539
Int. Cl. C09b 23/10
U.S. Cl. 260—240 E          8 Claims

ABSTRACT OF THE DISCLOSURE

Compounds of the formula

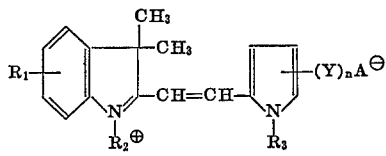

wherein $R_1$ represents hydrogen, halogen, lower alkyl, lower alkoxy, or alkoxycarbonyl;
$R_2$ represents lower alkyl, lower substituted alkyl, or aryl;
$R_3$ represents hydrogen, lower alkyl, lower substituted alkyl, or aryl;
Y represents hydrogen, alkyl, alkoxy or phenyl;
$n$ is 1, 2 or 3; and
A is a basic dye anion.

These compounds are useful as dyes for acrylic, modacrylic and acid-modified polyester textile fibers, yarns and fabrics.

---

This invention relates to novel pyrrole methine cationic compounds and to the use of such compounds as dyes for acrylic, modacrylic and acid-modified polyester textile fibers, yarns and fabrics.

The novel methine compounds of this invention have the general formula (I)

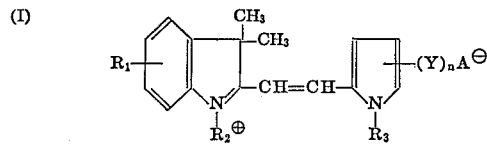

wherein $R_1$ represents hydrogen, halogen, lower alkyl, lower alkoxy, or alkoxycarbonyl; $R_2$ represents lower alkyl, lower substituted alkyl, or aryl; $R_3$ represents hydrogen, lower alkyl, lower substituted alkyl, or aryl; Y represents hydrogen, alkyl, alkoxy or phenyl; $n$ is 1, 2 or 3; and A is a basic dye anion.

The methine compounds of this invention give yellow to orange dyeings when applied to acrylic, modacrylic, and acid-modified polyester textile fibers, yarns and fabrics by conventional means.

Typical of the alkyl groups represented by each of $R_1$, $R_2$ and $R_3$ are methyl, ethyl, propyl, isobutyl, isopropyl, butyl and the like. Typical of the aryl groups represented by each of $R_2$ and $R_3$ are phenyl, lower alkyl substituted phenyl, e.g., p-tolyl, p-ethylphenyl, lower alkoxy substituted phenyl, e.g., p-anisyl, a halophenyl group, e.g., p-chlorophenyl, o,p-dibromophenyl and the like. As used herein to describe a substituent containing an alkyl moiety, "lower" designates a carbon content of from 1 to about 4 carbon atoms.

Typical of the substituents represented by Y include hydrogen, lower alkyl and alkoxy such as methoxy, ethoxy, propoxy, and butoxy. The alkoxy groups set forth above are also illustrative of the alkoxy groups that $R_1$ can represent. Typical of the alkoxy carbonyl substituents represented by $R_1$ are methoxycarbonyl, ethoxycarbonyl, propoxycarbonyl, butoxycarbonyl and the like. Typical of the substituents represented by $R_1$ as halogen are chloro, bromo and fluoro. Typical of the lower substituted alkyl groups represented by $R_2$ are hydroxyalkyl, e.g., 2-hydroxyethyl, alkoxyalkyl, e.g., 2-methoxyethyl, cyanoalkyl, e.g., 2-cyanoethyl, and the like.

Typical of the lower substituted alkyl groups represented by $R_3$ are hydroxyalkyl, e.g., 2-hydroxyethyl, alkoxyalkyl, e.g., 2-methoxymethyl, cyanoalkyl, e.g., cyanoethyl, haloalkyl, e.g., 2-chloroethyl, 3-chloropropyl, 2-bromoethyl, hydroxyhaloalkyl, e.g., 2-hydroxy-3-chloropropyl and the like.

Typical of the basic dye anions which A may represent are $Cl^-$, $Br^-$ or $I^-$, $ClO_4^-$, etc.

A preferred group of the novel compounds of this invention have the formula

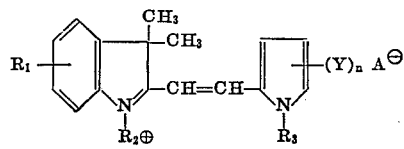

wherein $R_1$ represents hydrogen, halogen, lower alkyl, lower alkoxy or lower alkoxycarbonyl; $R_2$ represents lower alkyl, lower cyanoalkyl, lower hydroxyalkyl, lower alkoxyalkyl, benzyl or phenyl; $R_3$ represents hydrogen, lower alkyl, lower hydroxyalkyl, lower alkoxyalkyl, lower cyanoalkyl, lower haloalkyl, lower hydroxyhaloalkyl, or phenyl; Y represents hydrogen, lower alkyl, lower alkoxy or phenyl; $n$ is 1 or 2; and A represents a basic dye anion.

A particularly preferred group of the novel compound of this invention are those in which $R_1$ represents hydrogen, methyl, ethyl, methoxy, ethoxy, chloro, bromo, methoxycarbonyl or ethoxycarbonyl; $R_2$ represents lower alkyl, cyanoethyl or phenyl; $R_3$ represents hydrogen, lower alkyl, cyanoethyl or phenyl; Y represents hydrogen, lower alkyl, methoxy, ethoxy, cyanoethyl or phenyl; $n$ is 1 or 2; and A represents a basic dye anion.

The methine compounds are prepared according to well-known procedures. Thus, an appropriately substituted pyrrole-2-aldehyde having the formula

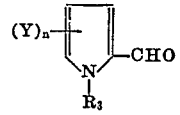

may be reacted with an appropriately substituted Fischer's base having the formula

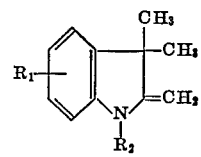

in acetic acid at steam bath temperatures. Acids other than acetic acid may be used as the reaction medium.

The Fischer's base compounds are well known and are described in the literature. The desired pyrrole-2-aldehyde may be prepared by the well-known Vilsmeir-Haack formulation of the pyrrole or by other known methods such as described in Acta Chemica Scandinavica, 6, 867–874 (1952). Alternately, the dyes can be prepared by condensation of 1,3,3 - trimethyl-2-methylene-indoline-ω-aldehyde (Fischer's aldehyde) with the pyrrole which has an unsubstituted 2 position.

Appropriate Fischer's bases which may be utilized in the preparation of the methine compounds of the invention include 1,3,3-trimethyl-2-methyleneindoline, methyl-1,3,3-trimethyl-2-methyleneindoline-5 carboxylate, 1,3,3-trimethyl-7-methoxy-2-methyleneindoline, 1,3,3-trimethyl 5-methoxy-2-methyleneindoline, etc.

Examples of suitable basic dye anions represented by A include Cl$^-$, Br$^-$, I$^-$, ClO$_4^-$, etc. The anion does not affect the utility of the methine cations of the invention as dyes nor does it affect the dye affinity of the cations for polyacrylonitrile textile materials. When the compounds are used to dye polyacrylonitrile textile material, the anion becomes associated with a positively-charged anion derived from the polyacrylonitrile and is removed from the dye cation and polyacrylonitrile textile material, either in the dye bath or in a subsequent washing of the dyed polyacrylonitrile textile material. Since the cation of a cationic methine dye is responsible for the color of the compound and the particular anion associated with the cation is not important, the novel methine compounds of the invention are described in the examples without being associated with any anion.

The following examples will serve to further describe and illustrate our invention:

PREPARATION OF PYRROLE-2-ALDEHYDES

Example 1—Preparation of 1-phenylpyrrole-2-carboxaldehyde

A solution of 14.3 g. of 1-phenylpyrrole in 20 ml. of dry dimethylformamide is treated dropwise with POCl$_3$, keeping the temperature between 15°–20° C., during the addition by ice cooling. When the addition is complete the reaction mixture is heated at 80–90° C., for about 1 hour on a steam bath. The solution is then drowned into 100 ml. of water and 50 g. of ice and allowed to stand at room temperature for several hours. The aldehyde is then extracted by the addition of 100 ml. of chloroform to the reaction mixture and the subsequent separation of the chloroform layer which is then dried over MgSO$_4$. The MgSO$_4$ is then filtered and the chloroform is allowed to evaporate at room temperature leaving 17.2 g. of product which has the formula

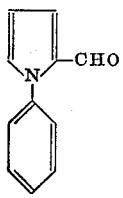

Example 2—Preparation of 1-β-cyanoethylpyrrole-2-carboxaldehyde

This compound is prepared exactly as described in Example 1, using 12.0 g. of 1-β-cyanoethylpyrrole. 7.5 g. of product is obtained and has the formula

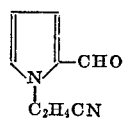

PREPARATION OF METHINE CATIONS

Example 3

A solution of the 1-phenylpyrrole - 2 - carboxaldehyde (0.87 g.) of Example 1 and 1,3,3-trimethyl-2-methyleneindoline (0.86 g.) are dissolved in acetic acid (10 ml.) and heated for 4 hours at 90–95° C. The solution is drowned in water and treated with KI, a gummy precipitate separates which is recrystallized from 2-β-alcohol to give a crystalline dye. This dye imparts reddish-yellow shades to acrylic, modacrylic and basic dyeable polyester fibers. It has the formula

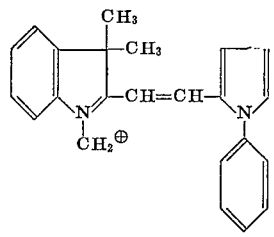

Example 4

A solution of 0.5 g. of pyrrole-2-carboxaldehyde and 0.86 g. of 1,3,3-trimethyl-2-methyleneindoline in 10 ml. of acetic acid is heated in a steam bath for 4 hours at 95–100° C., this yellow solution is poured into 100 ml. of water and treated with a small amount of Mg(ClO$_4$)$_2$. The precipitated perchlorate of the dye is collected on a funnel, washed with a small amount of water and air dryed. The following cation is obtained:

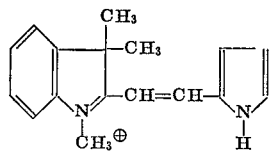

This dye imparts fast yellow shades to acrylic, modacrylic and basic dyeable polyester fibers.

Example 5

If the procedure of Example 3 is followed using 1-β-cyanoethylpyrrole-2-carboxaldehyde (0.75 g.) in place of the 1-phenyl derivative then the dye obtained imparts fast yellow shades to acrylic and modacrylic fibers. It has the formula

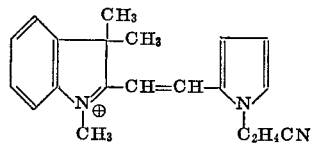

Example 6

If the procedure of Example 4 is followed using 1-methylpyrrole-2-carboxaldehyde (0.51 g.) in place of the unsubstituted pyrrole-2-carboxaldehyde then the dye which is obtained imparts fast reddish-yellow shades to acrylic, modacrylic and basic dyeable polyester fibers. It has the formula

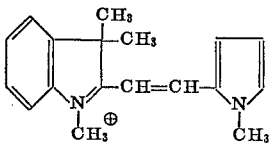

Examples 7–18

The cations set forth in Table I below correspond to general Formula I and are prepared as illustrated in Examples 3–6 and impart yellow color to acrylic, modacrylic and basic dyeable polyester fibers.

TABLE I

| Example number | R₁ | R₂ | R₃ | Y | Color |
|---|---|---|---|---|---|
| 7 | 5-Cl | CH₃ | H | H | Yellow. |
| 8 | 5-CO₂C₂H₅ | CH₃ | CH₃ | H | Do. |
| 9 | 5-CH₃O | CH₃ | C₆H₅ | H | Do. |
| 10 | H | C₂H₄CN | C₂H₅ | H | Do. |
| 11 | H | C₆H₅ | H | H | Do. |
| 12 | H | CH₃ | H | 2-CH₃ | Do. |
| 13 | H | CH₃ | H | 3,4-diCH₃ | Do. |
| 14 | H | CH₃ | H | 2,4-diCH₃ | Do. |
| 15 | H | CH₃ | H | 2,3-diCH₃, 4-CH₃O | Do. |
| 16 | H | CH₃ | H | 3-CH₃, 4-CH₃O | Do. |
| 17 | 5-Cl | CH₃ | C₂H₄CN | H | Do. |
| 18 | 5-CO₂CH₃ | CH₃ | H | H | Do. |

The compounds of the invention can be used for dyeing acrylic and modacrylic polymer fibers, yarns and fabrics giving a variety of fast violet to red shades when applied thereto by conventional dye methods. Acrylic textile materials are those which consist of at least 85 percent acrylonitrile and modacrylic textile materials are those consisting of at least 35 percent but less than 85 percent acrylonitrile. The compounds of the invention also give excellent dyeings on acid-modified acrylic fibers described in U.S. Pats. 2,837,500, 2,837,501 and 3,043,811. The novel compounds can also be used to dye sulfonate-modified polyester fibers such as are described in U.S. Pat. 3,018,272. Examples of the textile materials that are dyed with the compounds of the invention are those sold under the trade names "Orlon," "Orlon 42," "Verel," "Acrilan," "Dynel," "Creslan" and "Dacron 64." In general, the compounds, when used as dyes on the described textile materials, exhibit improved fastness, for example, to washing, to alkaline perspiration, gas (atmospheric fumes) and sublimation.

Textile materials dyed by the compounds of the invention are characterized by containing at least about 35 percent combined acrylonitrile units and up to about 95 percent acrylonitrile units, and modified, for example, by 65–5 percent of vinyl pyridine units as described in U.S. Pats. 2,990,393 and 3,014,008, or modified by 65–5 percent of vinylpyrrolidone units, for example, as described by U.S. Pat. 2,970,783, or modified with 65–5 percent acrylic ester of acrylamide units as described in U.S. Pats. 2,879,253, 2,879,254 and 2,838,470. Similar amounts of the other polymeric modifiers mentioned above are also useful. A preferred group of the copolymers readily dyeable with the dyes of the invention are the modacrylic polymers such as described in U.S. Pat. 2,831,826, composed of a mixture of (A) 70–95 percent by weight of a copolymer of from 30–65 percent by weight of vinylidene chloride or vinylchloride and 70–35 percent by weight of acrylonitrile, and (B) 30–5 percent by weight of a second polymer from the group consisting of (1) homopolymers of acrylamidic monomers of the formula

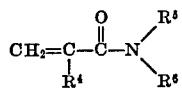

wherein R₄ is selected from the group consisting of hydrogen and methyl, and R₅ and R₆ are selected from the group consisting of hydrogen and alkyl groups of 1–6 carbon atoms, (2) copolymers consisting of at least two of said acrylamidic monomers, and (3) copolymers consisting of at least 50 percent by weight of at least one of said acrylamidic monomers and not more than 50 percent by weight of a polymerizable monovinyl pyridine monomer.

Another type of modacrylic polymer that can be dyed with the compounds of the invention is an acetone soluble mixture of (a) 70–95 percent by weight of a copolymer of 30–65 percent by weight of vinylidene chloride and 70–35 percent by weight of acrylonitrile and (b) 30–5 percent by weight of an acrylamide homopolymer having the above formula wherein R₄, R₅ and R₆ are described above. Specific polymers of that type contain 70–95 percent by weight of (a) a copolymer of from 30–65 percent by weight of vinylidene chloride and 70–35 percent by weight of acrylonitrile and (b) 30–5 percent by weight of a lower N-alkylacrylamide polymer such as poly-N-methacrylamide, poly-N-isopropylacrylamide and poly-N-tertiarybutylacrylamide.

The following example illustrates one way in which the compounds of the invention can be used to dye acrylonitrile polymer textile material.

Example 19

An amount of 0.1 g. of dye is dissolved by warming in 5 cc. of 2-methoxyethanol. A 2% aqueous solution of a non-ionic surfactant, such as Igepal CA (a polymerized ethylene oxide-alkylphenol condensation product), is added slowly until a fine emulsion is obtained and then the dye mixture is brought to a volume of 200 cc. with warm water. Five cc. of a 5% aqueous solution of formic acid or acetic acid are added and then 10 g. of fabric made from an acrylic fiber is entered and, in the case of "Orlon 42" acrylic textile material, the dyeing is carried out at the boil for one hour. In the case of materials made of "Verel" modacrylic fiber the dyebath temperature should not exceed 90° C. in order to avoid damage to the fiber. The dyed material is then washed well with water and dried.

Although this invention has been described in detail with particular reference to preferred embodiments thereof, it will be understood that variations and modifications can be effected within the spirit and scope of the invention.

We claim:
1. Dyestuff of the formula

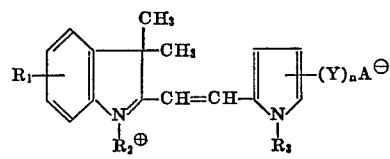

wherein
R₁ represents hydrogen, halogen, lower alkyl, lower alkoxy, or alkoxycarbonyl;
R₂ represents lower alkyl, lower substituted alkyl, phenyl or phenyl substituted with lower alkyl, halogen and lower alkoxy;
R₃ represents hydrogen, lower alkyl, lower substituted alkyl, phenyl or phenyl substituted with lower alkyl, halogen and lower alkoxy;
Y represents hydrogen, alkyl, alkoxy or phenyl;
n is 1, 2 or 3; and
A is a basic dye anion.

2. The dyestuff of claim 1 wherein $R_1$ represents hydrogen, halogen, lower alkyl, lower alkoxy, or lower alkoxycarbonyl;
$R_2$ represents lower alkyl, lower cyanoalkyl, lower hydroxyalkyl, lower alkoxyalkyl, benzyl or phenyl;
$R_3$ represents hydrogen, lower alkyl, lower hydroxyalkyl, lower alkoxyalkyl, lower cyanoalkyl, lower haloalkyl, lower hydroxyhaloalkyl, or phenyl;
Y represents hydrogen, lower alkyl, lower alkoxy or phenyl;
n represents 1 or 2; and
A represents a basic dye anion.

3. A dyestuff of claim 2 wherein $R_1$ represents hydrogen, methyl, ethyl, methoxy, ethoxy, chloro, bromo, methoxycarbonyl or ethoxy carbonyl;
$R_2$ represents lower alkyl, cyanoethyl or phenyl;
$R_3$ represents hydrogen, lower alkyl, cyanoethyl or phenyl;
Y represents hydrogen, lower alkyl, methoxy, ethoxy, cyanoethyl or phenyl;
n is 1 or 2; and
A represents a basic dye anion.

4. A compound as defined in claim 3 having the formula

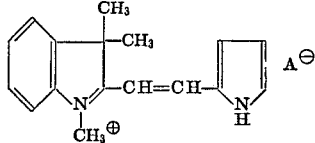

5. A compound as defined in claim 3 having the formula

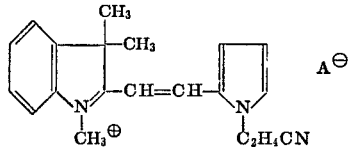

6. A compound as defined in claim 3 having the formula

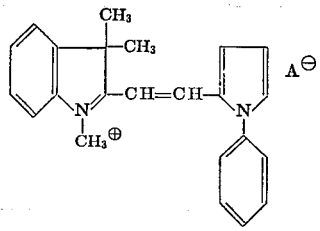

7. A compound as defined in claim 3 having the formula

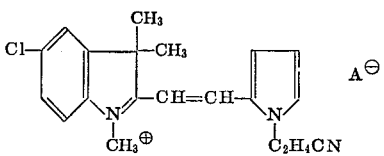

8. A compound as defined in claim 3 having the formula

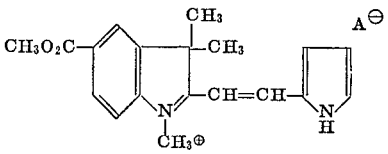

References Cited
UNITED STATES PATENTS 3,113,825   12/1963   Streck _____ 260—240 E
3,592,653   7/1971   Fumia et al. _____ 260—240 E JOHN D. RANDOLPH, Primary Examiner U.S. Cl. X.R.

8—177 R, 179; 260—326.5 J